(12) United States Patent
Lal

(10) Patent No.: US 6,832,336 B2
(45) Date of Patent: Dec. 14, 2004

(54) METHOD AND APPARATUS FOR MAINTAINING CONSISTENT DATA

(75) Inventor: Sanjay Lal, Cupertino, CA (US)

(73) Assignee: Redback Networks Inc., San Jose, CA (US)

(*) Notice: Subject to any disclaimer, the term of this patent is extended or adjusted under 35 U.S.C. 154(b) by 605 days.

(21) Appl. No.: 09/873,039

(22) Filed: Jun. 2, 2001

(65) Prior Publication Data

US 2002/0184572 A1 Dec. 5, 2002

(51) Int. Cl.[7] .............................................. G06F 11/00
(52) U.S. Cl. .............................. 714/29; 714/6; 714/28; 714/34; 714/35; 707/204
(58) Field of Search .............................. 714/6, 25, 31, 714/48, 28–29, 34, 35; 707/201–204

(56) References Cited

U.S. PATENT DOCUMENTS

| | | |
|---|---|---|
| 5,574,922 A | 11/1996 | James |
| 5,801,938 A | 9/1998 | Kalantery |
| 5,825,782 A * | 10/1998 | Roohparvar ................ 714/718 |
| 5,909,574 A * | 6/1999 | Meyer ........................ 712/244 |
| 5,954,829 A * | 9/1999 | McLain et al. ............. 714/712 |
| 6,094,530 A * | 7/2000 | Brandewie .................. 717/127 |
| 6,611,848 B1 * | 8/2003 | Bradley ...................... 707/201 |
| 6,662,282 B2 * | 12/2003 | Cochran ..................... 711/162 |

FOREIGN PATENT DOCUMENTS

| | | |
|---|---|---|
| WO | PCT/US02/15321 | 8/2002 |

OTHER PUBLICATIONS

Datta, A., "Databases for Active, Rapidly, Changing Data Systems (ARCS) and Handling Sensor Data in such Systems," IEEE TSE Paper No. L618, pp. 1–39, Apr. 7, 1996.

Datta, A., et al., "Providing Real–Time Response, State Regency and Temporal Consistency in Databases for Rapidly Changing Environments," pp. 1–34, May 16, 1996.

Xiong, M., et al., "Scheduling Acess to Temporal Data in Real–Time Databases," chapter 1, pp. 1–25, Department of Computer Science, University of Massachusetts, 1997.

* cited by examiner

*Primary Examiner*—Robert Beausoliel
*Assistant Examiner*—Emerson Puente
(74) *Attorney, Agent, or Firm*—Blakely, Sokoloff, Taylor & Zafman LLP

(57) ABSTRACT

A method and apparatus for maintaining consistent data is described. A computer implemented method comprises generating a first command for a set of network data to be executed on a local memory, executing a second command for the set of network data on a remote memory in response to generation of the first command, determining whether the second command has been executed successfully on the remote memory, executing the first command on the local memory upon determining the second command is executed successfully, and generating an error upon determining the second command is not executed successfully.

46 Claims, 4 Drawing Sheets

METHOD AND APPARATUS FOR MAINTAINING CONSISTENT DATA

BACKGROUND OF THE INVENTION

1. Field of the Invention

The invention relates to the field of communications. More specifically, the invention relates to communication networks.

2. Background of the Invention

Control card redundancy improves reliability of network elements. Having a secondary control card with the same information as the primary control cards enables a network element to withstand hardware and/or software failure on the primary card. In addition, the secondary control card enables maintenance of network elements. The primary control card can be pulled for repairs or testing because the secondary control card will take over operations.

To avoid interruptions in service, consistency must be maintained between control cards. Information received by the primary control card is passed to the secondary control card. After the information is stored on the primary control card it is copied to the secondary control card.

This prior art technique has the disadvantage of exposing the network element to disruption. A failure may occur before information is copied to the secondary control card. When the secondary control card takes over operation of the network element, the secondary control card will be lacking information. The network administrator will have to discover the inconsistencies and correct these inconsistencies. In addition, the inconsistencies may cause service to be disrupted to a customer.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1:
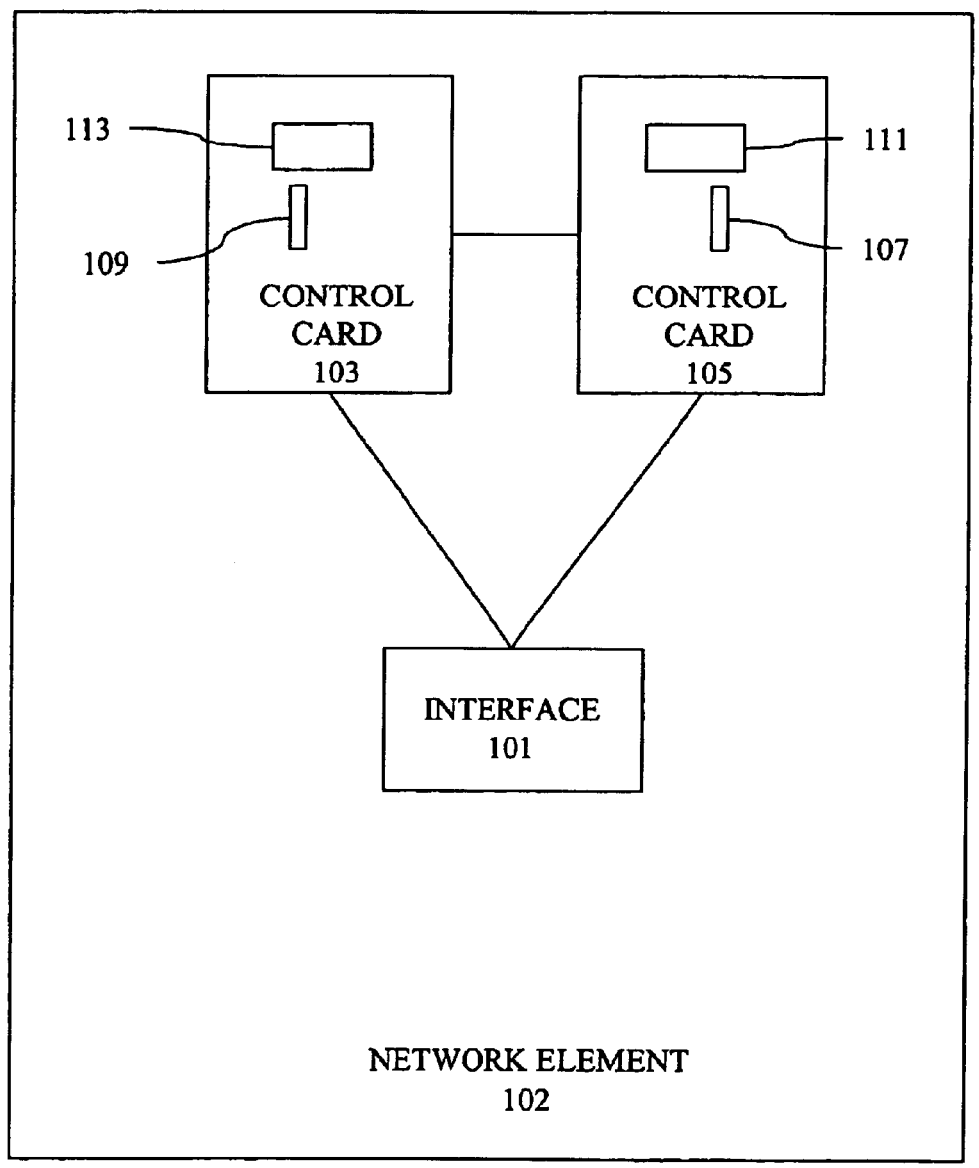
FIG. 1 is a diagram of a network element according to one embodiment of the invention.

FIG. 1 is a diagram of a network element according to one embodiment of the invention. In FIG. 1, a network element 102 includes two control cards 103 and 105 and an interface 101. Examples of a network element include routers, switches, bridges, edge devices, etc. The control card 103 is connected to the control card 105. The control card 103 includes a processor 113 and a memory 109. The control card 105 also includes a processor 111 and a memory 107.

During operation of the network element 102, one of the control cards 103, 105 is designated as the primary control card while the other is the secondary control card. If the primary control card fails then the secondary control card operates in place of the primary control card. Both of the control cards 103, 105 are connected to an interface 101.

The interface receives input from a user. Although the interface is shown as part of the network element, the interface can be a remote terminal in another embodiment of the invention. This input is sent from the interface to the primary control card. If the control card 103 is the primary control card, then the interface 101 transmits configurations, data, etc. to the control card 103. To maintain consistency between the control cards, information stored on the primary control card is duplicated on the secondary control card. Continuing the example of the control card 103 as the primary control card, the control card 103 transmits information received from the interface 101 to the control card 105 before storing the information in its memory 109. The control card 105 receives information (configurations, network data, etc.) from the control card 103 and writes the information to its memory 107. Before information is written to the memory 107, the information is written to the memory 109.

In one embodiment of the invention, global mapping is implemented in the network element 102. Global mapping provides a unique address for hardware throughout the network element. With global mapping, the control card 103 can modify the memory 109 directly. Likewise, the control card 105 can modify the memory 107 directly.

Figure 2:
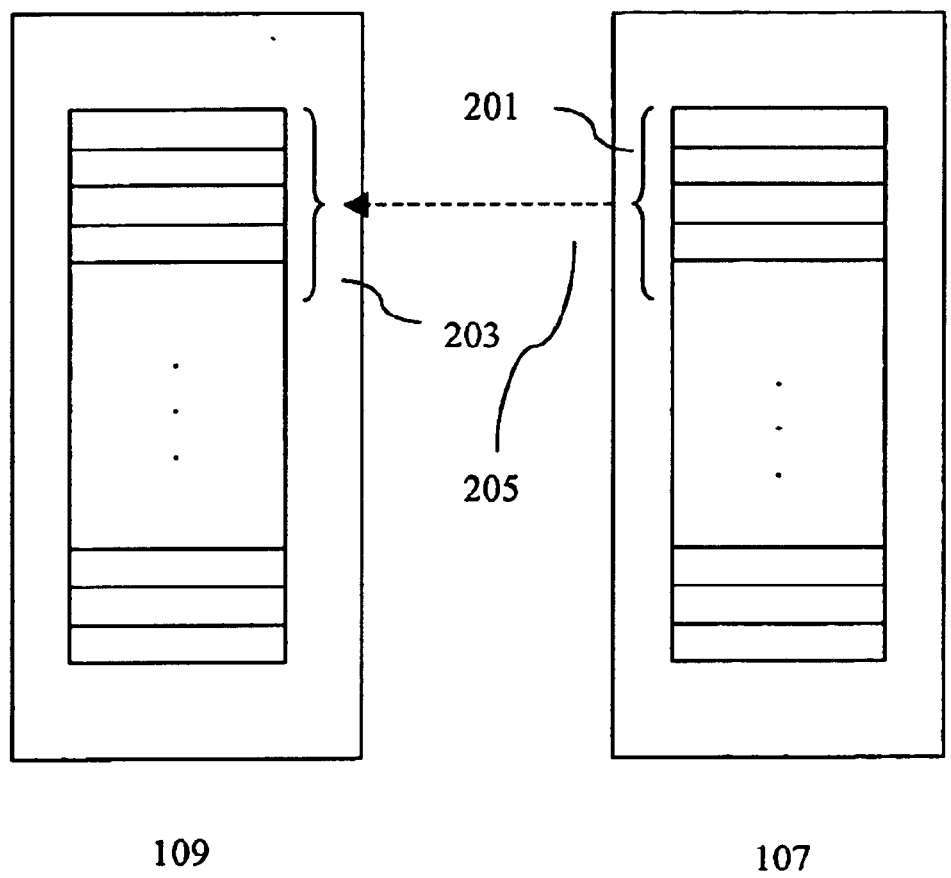
FIG. 2 is a diagram of the memory 109 and the memory 107 of FIG. 1 according to one embodiment of the invention.

FIG. 2 is a diagram of the memory 109 and the memory 107 of FIG. 1 according to one embodiment of the invention. In FIG. 2, a dashed line 205 indicates a region 201 of the memory 107 being mapped to a region 203 of the memory 109. The memory management process will associate addresses of the region 201 to addresses of the region 203. In another embodiment of the invention, all of the memory 107 is mapped to the memory 109.

Figure 3:
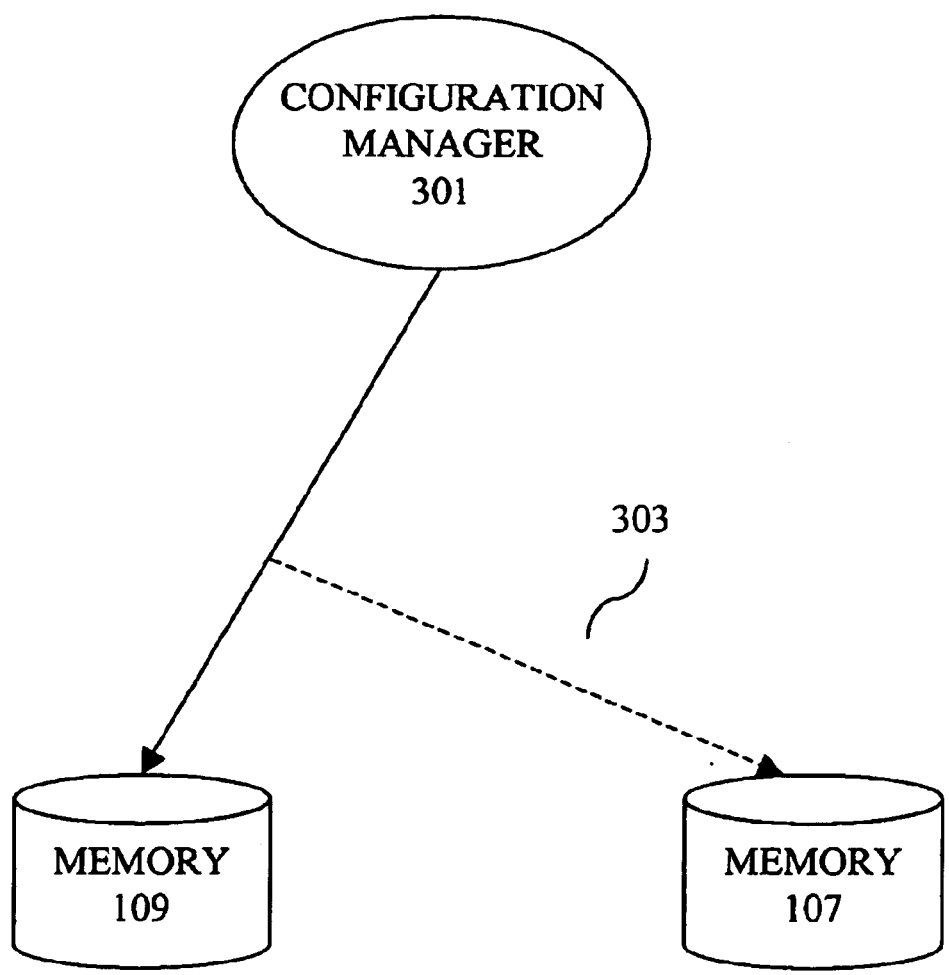
FIG. 3 is a diagram of a configuration manager interacting with the memory 107 and 109 of FIG. 1 according to one embodiment of the invention.

FIG. 3 is a diagram of a configuration manager interacting with the memory 107 and 109 of FIG. 1 according to one embodiment of the invention. In FIG. 3, a configuration manager 301 receives configurations and processes the configurations. The configuration manager breaks down a configuration into a component or components and determines if a write, update or delete operation or operations is required. The configuration manager 301 then requests a write for write and update operations and a delete for delete operations. The request from the configuration manager 301 corresponds to an address in the memory 109, assuming the memory 109 is being used by the primary control card. Before the request is carried out or executed, an exception causes the operation to be performed on a corresponding address in the memory 107 as indicated by the dashed line 303.

Figure 4:
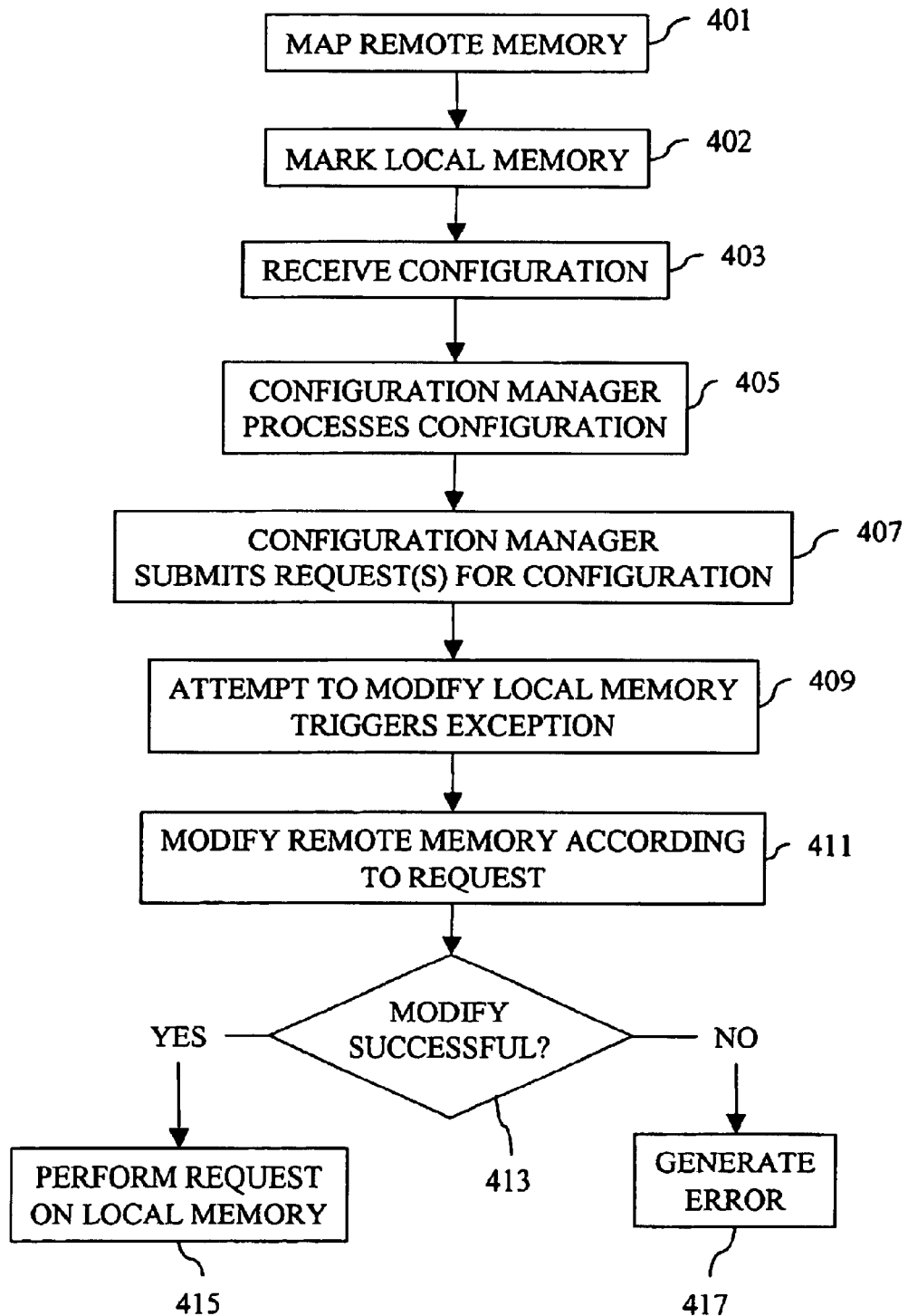
FIG. 4 is a flowchart for storing information to backup memory according to one embodiment of the invention.

FIG. 4 is a flowchart for maintaining consistency of data between local and remote memory according to one embodiment of the invention. In FIG. 4 at block 401, remote memory is mapped. It is assumed that local memory is on the primary control card and remote memory is on the secondary control card. At block 402, local memory is marked with a flag that will cause an exception. In another embodiment of the invention, local memory has read-only permission until a command is successfully performed on remote memory. In such an embodiment, once local memory is modified, read-only permission is reinstated. At block 403, configuration(s) are received from the interface 101 of FIG.

1. At block 405, the configuration manager 301 of FIG. 3 processes the configurations. At block 407, the configuration manager 301 submits modification requests (i.e., write or delete operations) corresponding to the processed configurations. At block 409, the submitted modification request(s) for local memory trigger an exception(s). In an embodiment of the invention, this exception is spawned by the operating system when attempts are made to modify given areas of local memory. In one such embodiment, given locations of local memory are associated with given exceptions. For example, referring to FIG. 2, a write command is generated for the area 203 of the local memory 109. The exception spawned by the request to write to the area 203 is associated to the area 201 of the remote memory 107. In another embodiment of the invention, a write or delete is only allowed on local memory once remote memory is modified. Otherwise, read-only permission is enforced on local memory.

At block 411, the exception(s) modifies the remote memory in accordance with the requests (i.e., data is written or removed from the remote memory). At block 413, it is determined if the exception request was executed successfully. If the exception request was executed successfully, then at block 415 the request is executed on the local memory. If the exception request was not executed successfully on the remote memory, then at block 417 an error is generated. The error can be transmitted to an error parser or directly to the user via the interface.

In one embodiment of the invention, the exception are software interrupts. In another embodiment of the invention, these exceptions are hardware interrupts.

Insuring data is written or deleted from a secondary memory of a secondary control card before being written or deleted from a primary memory of a primary control card avoids inconsistency of data between control cards. If an error occurs with the control card before the data is written to the primary memory, then the secondary control card has the most recent version of data or configurations. If the data is not written to the secondary memory, then the primary and secondary control cards still have the same information.

Furthermore, implementing the embodiments herein of the invention at the lowest level, such as with kernel exceptions, provides a simple backup mechanism with high performance. The complications of higher level backup applications are avoided. In addition, the secondary control card can take control immediately.

The network element 102 includes line cards in addition to the control cards 103 and 105. Line cards in the network element 102 and the control cards 103 and 105 include memories, processors, and/or Application Specific Integrated Circuit ("ASICs"). Such memories and the memories 107 and 109 include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A computer implemented method comprising:
   generating a first command for a set of network data to be executed on a local memory;
   triggering an exception responsive to attempting execution of the first command on the local memory;
   executing a second command for the set of network data on a remote memory in response to the exception;
   determining whether the second command has been executed successfully on the remote memory;
   executing the first command on the local memory upon determining the second command is executed successfully; and
   generating an error upon determining the second command is not executed successfully.

2. The computer implemented method of claim 1 wherein the set of network data is a set of configurations.

3. The computer implemented method of claim 1 wherein the first command is a write command to an address of the local memory and the second command is a write command to an address of the remote memory.

4. The computer implemented method of claim 1 wherein the first command is a delete command for an address of the local memory and the second command is a delete command for an address of the remote memory.

5. A computer implemented method comprising:
   mapping a first memory to a second memory;
   receiving a set of configurations;
   processing the set of configurations;
   generating a set of commands for the first memory, the set of commands corresponding to the processed set of configurations; and
   triggering an exception when beginning to execute the set of commands on the first memory, wherein the exception causes the following:
   executing the set of commands on the second memory in response to the exception;
   upon determining the set of commands are executed successfully on the second memory, completing execution of the set of commands on the first memory; and
   upon determining the set of commands are not executed on the second memory successfully, generating an error.

6. The computer implemented method of claim 5 wherein the set of configurations are for a set of network processes.

7. The computer implemented method of claim 5 wherein the error is displayed as a text message.

8. The computer implemented method of claim 5 wherein the error is passed to an error parser.

9. The computer implemented method of claim 5 wherein the mapping the first memory to the second memory comprises associating a set of addresses of the first memory to a set of addresses of the second memory.

10. The computer implemented method of claim 5 wherein the set of commands are a set of write commands.

11. The computer implemented method of claim 5 wherein the set of commands are a set of delete commands.

12. A computer implemented method comprising:
receiving a request to modify configuration data located at a local address in local memory in an active control card; and
generating an exception when the configuration data located at the local address in the local memory is attempted to be modified, wherein the exception causes, within a processor in the active control card, the following:
modifying configuration data located at a remote address in remote memory in an inactive control card, wherein the configuration data located at the local address corresponds to the configuration data located at the remote address;
modifying the configuration data located at the local address in local memory in the active control card upon determining that the modification of the configuration data located at the remote address in the remote memory in the inactive control card was successful; and
generating an error without modifying the configuration data located at the local address in local memory in the active control card upon determining that the modification of the configuration data located at the remote address in the remote memory in the inactive control card was not successful.

13. The computer implemented method of claim 12 wherein the request is to write the configuration data.

14. The computer implemented method of claim 12 wherein the request is to delete the configuration data.

15. The computer implemented method of claim 12 wherein the error is displayed on an interface.

16. The computer implemented method of claim 12 wherein the error is passed to an error parser.

17. An apparatus comprising:
an interface to receive a set of configurations;
a first control card coupled to the interface, the first control card having a first memory; and
a second control card coupled to the interface and the first control card, the second control card including a second memory, the second control card to receive the set of configurations from the interface, to generate a set of commands for the set of configurations, to trigger an exception responsive to beginning to execute the set of commands on the second memory, to execute the set of commands on the first memory in response to the exception, and to execute the set of commands on the second memory of the second control card in response to successful completion of the set of commands on the first memory.

18. The apparatus of claim 17 wherein the first memory and the second memory are a first main memory and a second main memory.

19. The apparatus of claim 17 wherein the first memory and the second memory are a first storage and a second storage.

20. The apparatus of claim 17 wherein the first memory is mapped into the second memory.

21. The apparatus of claim 17 further comprising the second control card to generate an error if the set of commands are not executed successfully on the first memory.

22. The apparatus of claim 17 wherein the set of commands are a set of write commands.

23. The apparatus of claim 17 wherein the set of commands are a set of delete commands.

24. A machine-readable medium that provides instructions, which when executed by a set of processors of one or more processors, cause said set of processors to perform operations comprising:
generating a first command for a set of network data to be executed on a local memory;
triggering an exception responsive to attempting execution of the first command on the local memory:
executing a second command for the set of network data on a remote memory in response to the exception;
determining whether the second command has been executed successfully on the remote memory;
executing the first command on the local memory upon determining the second command is executed successfully; and
generating an error upon determining the second command is not executed successfully.

25. The machine-readable medium of claim 24 wherein the set of network data is a set of configurations.

26. The machine-readable medium of claim 24 wherein the first command is a write command to an address of the local memory and the second command is a write command to an address of the remote memory.

27. The machine-readable medium of claim 24 wherein the first command is a delete command for an address of the local memory and the second command is a delete command for an address of the remote memory.

28. A machine-readable medium that provides instructions, which when executed by a set of processors of one or more processors, cause said set of processors to perform operations comprising:
associating a first memory to a second memory;
receiving a set of configurations;
processing the set of configurations;
generating a set of commands for the first memory, the set of commands corresponding to the processed set of configurations; and
triggering an exception when processing the set of commands for the first memory, wherein the exception causes the following:
executing the set of commands on the second memory;
upon determining the set of commands are executed successfully on the second memory, executing the set of commands on the first memory; and
upon determining the set of commands are not executed on the second memory successfully, generating an error.

29. The machine-readable medium of claim 28 wherein the set of configurations are for a set of network processes.

30. The machine-readable medium of claim 28 wherein the error is displayed as a text message.

31. The machine-readable medium of claim 28 wherein the error is passed to an error parser.

32. The machine-readable medium of claim 28 wherein the associating the first memory to the second memory comprises associating a set of addresses of the first memory to a set of addresses of the second memory.

33. The machine-readable medium of claim 28 wherein the set of commands are a set of delete commands.

34. The machine-readable medium of claim 28 wherein the set of commands are a set of delete commands.

35. A machine-readable medium that provides instructions, which when executed by a set of processors of one or more processors, cause said set of processors to perform operations comprising:

receiving a request to modify configuration data located at a local address in local memory in an active control card; and generating an exception when the configuration data located at the local address in the local memory is attempted to be modified, wherein the exception causes, within a processor in the active control card, the following:

modifying configuration data located at a remote address in remote memory in an inactive control card, wherein the configuration data located at the local address corresponds to the configuration data located at the remote address;

modifying the configuration data located at the local address in local memory in the active control card upon determining that the modification of the configuration data located at the remote address in the remote memory in the inactive control card was successful; and generating an error without modifying the configuration data located at the local address in local memory in the active control card upon determining that the modification of the configuration data located at the remote address in the remote memory in the inactive control card was not successful.

36. The machine-readable medium of claim 35 wherein the request is to write the configuration data.

37. The machine-readable medium of claim 35 wherein the request is to delete the configuration data.

38. The machine-readable medium of claim 35 wherein the error is displayed on an interface.

39. The machine-readable medium of claim wherein 35 wherein the error is passed to an error parser.

40. An apparatus for maintaining consistency of data between control cards comprising:

a network element including:

a first and second control cards, each including a processor and a memory, to operate in a primary and secondary relationship such that there is a current primary one and a current secondary one of the first and second control cards, the current primary one of the first and second control cards to ensure data is written or deleted from the memory of the current secondary one of the first and second control cards before being written or deleted from the memory of the current primary one, wherein exceptions are triggered responsive to attempts to make such modifications of the memory of the current primary one, wherein each of said exceptions cause an attempt to make the modification to the memory of the current secondary one, and wherein only successful ones of the modifications to the memory of the current secondary one are performed on the memory of the current primary one.

41. The apparatus of claim 40 wherein the first and second control cards are coupled to a configuration manager, the configuration manager designed to send commands to the first and second control cards.

42. The apparatus of claim 40 wherein the exceptions are triggered by a flag contained in the memory of the current primary one of the first and second control cards.

43. The apparatus of claim 40 wherein the exceptions cause an error to trip when modification of the memory of the current secondary one of the first and second control cards is unsuccessful.

44. The apparatus of claim 40 wherein the first and second control cards are globally mapped to enable modification of memory directly.

45. The apparatus of claim 40 wherein the memory of the current primary one of the first and second control cards is read-only until successful modification of the current secondary one of the first and second control cards.

46. The apparatus of claim 40 wherein the exception is triggered in hardware.

* * * * *